United States Patent [19]
Schaeffer et al.

[11] 3,777,848
[45] Dec. 11, 1973

[54] AIR BREATHER FITTING FOR RESERVOIRS

[75] Inventors: Langdon C. Schaeffer, Webster Groves, Mo.; Roland C. Thomas, Dover, Ky.

[73] Assignee: Emerson Electric Company, St. Louis County, Mo.

[22] Filed: Apr. 14, 1972

[21] Appl. No.: 244,117

[52] U.S. Cl.............. 184/1 C, 55/520, 123/41.86, 184/6.23
[51] Int. Cl........................................... F01m 11/10
[58] Field of Search...................... 55/178, 87, 385, 55/520; 92/178, 179; 184/1 C, 6.23; 123/41.86, 196 CP

[56] References Cited
UNITED STATES PATENTS

| | | | |
|---|---|---|---|
| 3,550,567 | 4/1968 | Crow | 92/78 X |
| 2,125,435 | 8/1938 | Erling | 55/520 X |
| 3,199,417 | 8/1965 | Young et al. | 92/79 |
| 3,601,225 | 8/1971 | Nahl, Jr. et al. | 184/6.23 X |
| 2,663,084 | 12/1953 | Coderre | 184/1 C |
| 2,849,994 | 9/1958 | Barker | 184/6.23 |
| 3,271,938 | 9/1966 | Rest et al. | 123/41.86 X |

FOREIGN PATENTS OR APPLICATIONS

526,582 5/1955 Italy.................. 123/41.86

Primary Examiner—Manuel A. Antonakas
Attorney—Philip B. Polster et al.

[57] ABSTRACT

A device for equalizing pressure in agitated oil in a closed container without permitting oil escape is provided and includes a cap having a pervious shielding element depending from it. The shielding element prevents bubble formation in a breather passage extending through the cap by dissipating any bubbles formed, before their entrance into the breather passage, thereby permitting air release while preventing oil loss through the breather passage.

9 Claims, 10 Drawing Figures

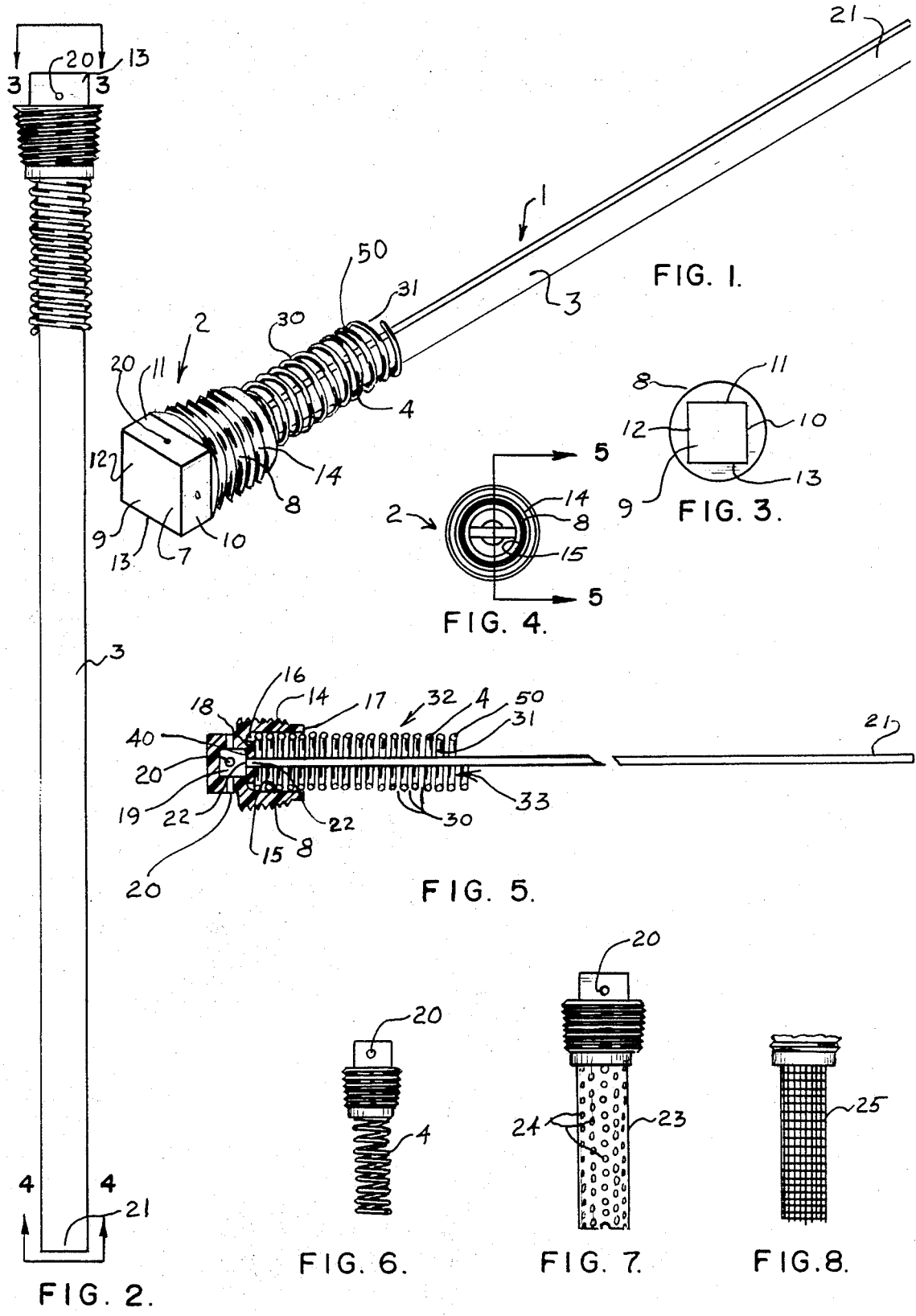

PATENTED DEC 11 1973 3,777,848

AIR BREATHER FITTING FOR RESERVOIRS

BACKGROUND OF THE INVENTION

This invention relates to an air breather and dipstick for oil reservoirs. Those skilled in the art, however, will recognize the wide applicability of the air breather-dipstick of our invention in other fluid and liquid systems.

It is common, in the operation of large machines, for example, industrial conveyors, lathes, and other apparatus where speed of the apparatus is controlled by some form of mechanical gearing, rotating member, or reciprocating means, to provide a system for lubricating the moving mechanism. Conventionally, the lubricating system is some form of oil bath or oil sump through which the moving mechanism passes. The necessary lubricating oil for low friction operation of the mechanism adheres to the mechanism as it passes through the sump during the normal operating cycle of the apparatus. During this operation, the oil contained in the lubricating system becomes turbulent because of the action of the moving mechanism, which constantly churns the oil. The churning in turn causes the formation of air bubbles in the oil. These bubbles constantly burst and regenerate during apparatus operation. However, bubble generation far exceeds the normal capacity for bubble breakage.

It has long been known that it is desirable, if not mandatory, to provide a means to vent the lubricating system. Where the apparatus is operated for extended periods of time, as is the case in industrial applications, the apparatus tends to generate heat, a part of which will be given off in the lubricating system. This heat generation is observed as increased oil temperature. A temperature increase within the lubricating system causes expansion of any gas contained within the system in accordance with well known and elementary gas laws. The additional pressure exhibited by the expanded gases can act on bearing seals of the apparatus causing them to leak or otherwise adversely effect apparatus operation. To prevent this pressure build up, it is conventional to vent the oil sump. The vents commonly comprise a threaded member having a tubular structure depending from it. The tubular structure has a solid side wall which side wall defines a relatively small axial opening along the length of the tubular structure permitting communication between the oil sump or reservoir and the atmosphere. It has been conventional to include one or two radial openings through the side wall of the tubular structure which communicate with the axial opening defined thereby. The threaded member often is a pipe stem fitting with a radial hole through it which connects the external atmosphere to the axial and radial openings of the depending member.

While these prior art devices, as a class, work for their air venting purpose, they are deficient because they permit venting of both air and oil. That is, as the apparatus described above churns the oil, forming bubbles, there is established a condition which resembles, for illustrative purposes, an over-sudsing condition in a washing machine. As in the washing machine, the bubbles of air and oil rise above the liquid level and attempt to exit their enclosed space by any convenient and accessible opening. Where this situation exists in an oil sump, the bubbles of air and oil tend to rise through the air breather tube and escape to the atmosphere. Conventional breathers heretofore have not possessed reliable means for preventing this exodus. That is, the bubbles tend to form a coherent mass within the axial opening of the tubular structure described above and are forced out of the exit opening of the vent by the internally generated pressure. The oil-air bubbles, in leaving the exit opening of the venting means, tend to break apart, which results in a fairly continuous seepage of oil from the venting means. Such seepage is at best a troublesome maintenance problem and at worst may reduce the volume of oil contained in the reservoir or sump below acceptable operating levels; or it may be a safety hazard to personnel working about apparatus. Additionally, this seepage is not acceptable in sanitary areas, for example, cooking areas of restaurants, and bakeries, where escaping oil collects dirt which can not be cleaned easily.

Our invention reduces the possibility of air-oil bubble escape by providing a surface for bubble cohesion and breakage. The surface also defines an air path to the atmosphere to enable the device to perform its venting function.

One of the objects of this invention is to provide a low cost air vent means for oil reservoirs.

Another object of this invention is to provide an improved air vent means which reduces oil-air bubble leakage from oil reservoirs to a minimum.

Yet another object of this invention is to provide an improved air venting means and dipstick combination.

Other objects of this invention will be apparent to those skilled in the art in light of the following description and accompanying drawings.

SUMMARY OF THE INVENTION

In accordance with this invention, generally stated, an air venting means for a turbulent, enclosed liquid is provided having an air pervious dependent member. The air pervious member collects air-liquid bubbles along its external surface and breaks the bubbles prior to their escape through the air vent passage. Because of the geometry of the pervious member, bubbles entering the lowest point of the air vent passage are unable to form a coherent mass and they too break apart before internal pressure forces them through the air vent passage.

In the preferred embodiment, the air venting device is combined with an attached dipstick. The pervious member comprises a helical wire coil fitted on one end with a pipe cap. The dipstick is joined along the top of the pipe cap.

BRIEF DESCRIPTION OF THE DRAWINGS

In the drawings,

FIG. 1 is a view in perspective of one illustrative embodiment of air breather dipstick of this invention;

FIG. 2 is a view in side elevation of the air breather dipstick illustrated in FIG. 1;

FIG. 3 is a top plan view taken along the line 3—3 of FIG. 2;

FIG. 4 is a bottom plan view taken along the line 4—4 of FIG. 2;

FIG. 5 is a sectional view taken along the line 5—5 of FIG. 4;

FIG. 6 is a view in side elevation of a second illustrative embodiment for air breather of this invention;

FIG. 7 is a view in side elevation of a third illustrative embodiment of air breather of this invention;

FIG. 8 is a view in side elevation, partly broken away, of a fourth illustrative embodiment of air breather of this invention;

DESCRIPTION OF THE PREFERRED EMBODIMENT

Figure 9:
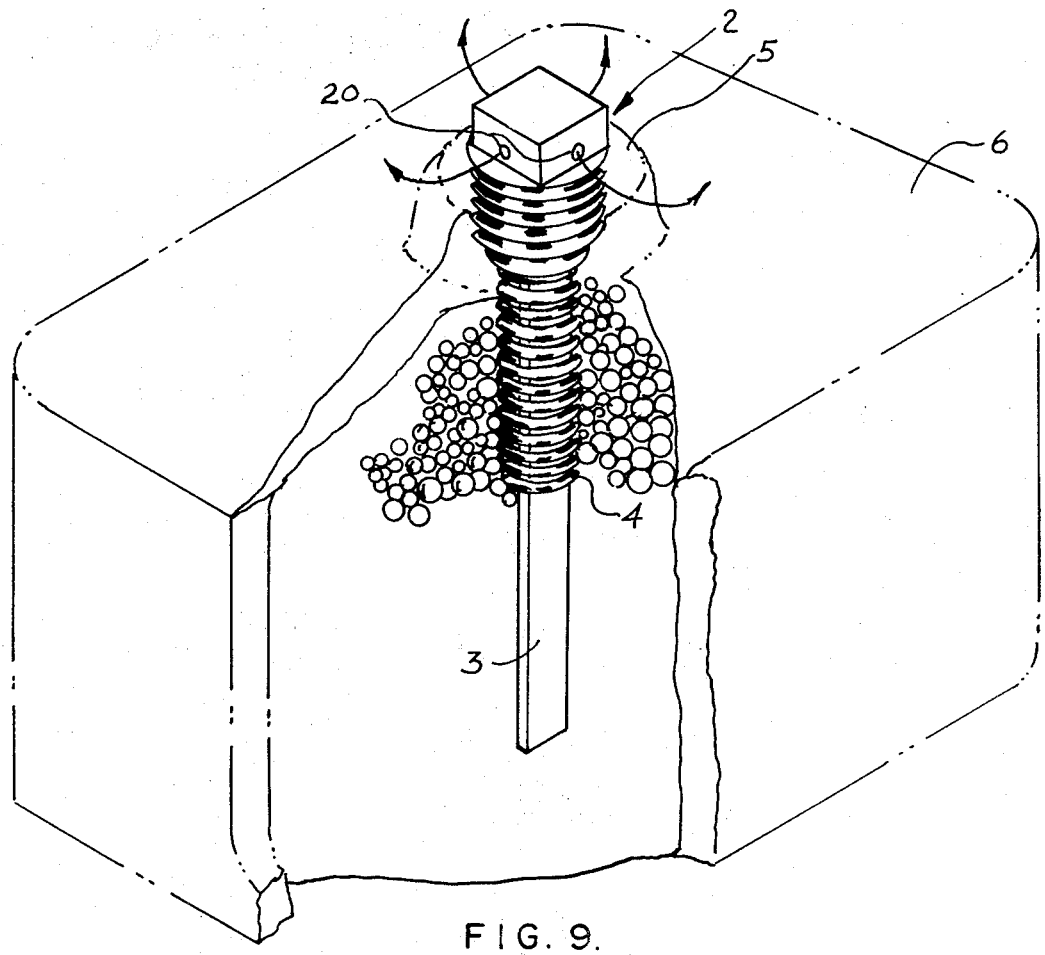
FIG. 9 is a view in perspective of the air breather dipstick shown in FIG. 1 illustrated in conjunction with an oil sump.

Referring now to FIG. 1, reference numeral 1 refers generally to an air breather dipstick of this invention. Dipstick 1 includes a plug portion 2, a dipstick 3 and an air pervious shield member 4.

The plug 2, in the embodiment illustrated, is adapted for use as a common pipe plug in that it is intended to close an opening 5 in an oil reservoir 6, as is illustrated in FIG. 9. Plug 2 includes a cap 7 and a tubular section 8. Cap 7 is a rectangular body having a top 9 and a plurality of sides designated by the numerals 10, 11, 12 and 13. The cap 7 is intended to be engaged by a conventional wrench, not shown, along the various sides of the cap 7, allowing the air breather dipstick 1 to be tightened in the opening 5 of reservoir 6. While the plug 2 is described as a pipe plug, those skilled in the art will recognize that the plug 2 can assume a variety of configurations. Thus, the plug 2 may be adapted for press fitting the opening 5. It may be inserted and permanently sealed in the opening 5 by some form of adhesive. Other forms or combinations of insertion structures and methods may be utilized.

Tubular section 8 is formed integrally with the cap 7 and has a threaded outer wall 14 and an inner wall 15, separated by the material thickness of the plug 2. The outer wall 14 may be tapered, as illustrated in FIG. 5, as an insertion and sealing aid for the device of this invention.

Section 8 has an axial opening 16 through it. Opening 16 has a reservoir end 17 and a plug end 18. End 18 communicates with a chamber 19 defined by the sides 10, 11, 12 and 13 and the top 9 of the cap 7. A vent 20 extends radially outwardly from chamber 19 through each of the sides 10, 11, 12 and 13 of the cap 7 to the atmosphere. Although the illustrative embodiment has a vent 20 extending through each of the sides of the cap 7, those skilled in the art will recognize that the shape of the cap 7 may be changed, for example, to a hexagonal design, and the number of vents or shape of the cap 7 may vary in other embodiments of the invention. For example, certain applications utilizing our invention subject the machinery and oil sump containing the air breather 1 to an actual wash-down operation. The vent 20 must not permit entry of water during the wash-down. In such applications, the vent 20 may comprise a thin slit in the side wall which permits pressure equalization but tends to retard the entrance of foreign matter.

Dipstick 3, in the embodiment of FIG. 1, is a relatively long and narrow rectangular strip of metal having a first end 21 and a second end 22. Dipstick 3 may have various markings on it, not shown, for indicating oil level or other information near the end 21 of dipstick 3. The end 22 is positioned within the opening 16 of the tubular section 8. End 22 is staked to form a shoulder 40. The function and purpose of shoulder 40 is described in detail hereinafter. Dipstick 3 is conventional in and of itself, and may assume a variety of lengths or configurations. It also may be constructed from a variety of materials. Stamped metal works well, for example.

As illustrated in FIG. 1, shield 4 is a coil of wire 50 extending convolutely and depending from plug 2. The design of the shield 4 is important. In this particular embodiment, the convolutions of the wire coil 50 defines a plurality of spaced, radial openings 30, while the diameter of the wire coil 50 subtends an axial opening 31. The radial openings 30 are small in comparison to the air-oil bubbles generated internally of the oil reservoir 6 while the axial opening 31 is large in the same comparison. The exact scientific explanation as to why the breather of our invention prevents oil seepage prevalent in the prior art is unknown. It is theorized, however, that a majority of the bubbles adhere to an outer surface 32 of the shield 4 and are broken as they attempt to pass through the openings 30. Bubbles entering the opening 31 likewise tend to adhere to an inner surface 33 of the shield 4. The relatively large diameter of the opening 31 prevents formation of a coherent mass within opening 31. Consequently, these bubbles are permitted to break as they are forced upwardly within the opening 31 by the internal pressure in the oil reservoir 6. The axial length of the shield 4 may be varied. Again it is theorized that a minimum length for the shield 4 exists, but that length has not been determined. We find that a shield 4 axial length of approximately 2 inches works well in the majority of applications known to us.

Construction of air breather dipstick of this invention is simple. It is intended that the plug 2 comprises a molded plastic material. Dipstick 3 is staked as previously described and the shield 4 is inserted over the end 21 of the dipstick 3. The diameter of the convoluted shield 4 is chosen such that the end adjacent shoulder 40 of dipstick 3 will abut the shoulder and will prevent passage of dipstick 3 through the longitudinal opening defined by the convolutions of the wire coil 50. The diameter also is chosen to enable shield 4 to be inserted within opening 16 of tubular section 8 in a tight friction fit. Attaching may be facilitated by preheating the shield 4 after its intermounting with dipstick 3 and inserting it within the plastic plug 2. This procedure allows inner wall 15 of the plug 2 to soften, enabling the shield 4 to become embedded in it. After cooling, the embedded shield 4 is sufficiently engaged with the plug 2 that normal use will not cause their separation.

Various other embodiments of our invention are contemplated, and four such embodiments are illustrated in FIGS. 6 through 8 and FIG. 10. As previously indicated, the dipstick 3 is an optional embellishment of our invention and the embodiments of the FIGS. 6 through 8 illustrate only air breather functions. FIG. 6, of course, is identical to the embodiment of FIG. 1 except for the removal of the dipstick 3. Construction is accomplished in the same manner as described above.

In FIG. 7, the shield 4 comprises a tubular section 23 having a plurality of perforations 24 in it. In FIG. 8, the shield 4 comprises a screen element 25 formed into a tubular silhouette. Each of these embodiments works well for its air venting purposes, but we have found the use of the coiled spring to offer the lowest cost device.

Figure 10:
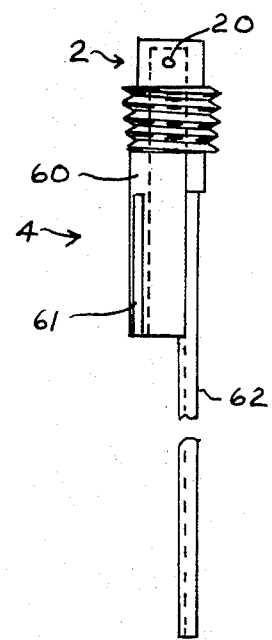
FIG. 10 is a view in side elevation, partly broken away, of a fifth illustrative embodiment of air breather dipstick of this invention.

Illustrated in FIG. 10 is a plastic embodiment of our invention. As there shown, the shield 4 comprises an element 60 formed integrally with the plug 2. Element 60 has at least one, and preferably a plurality of axial slots 61 in it. The slots 61 function in the same manner as the radial openings 30. A dipstick 62 is attached to the plug 2. The dipstick 62 may be formed separately and later interconnected or it also may be constructed integrally with the plug 2 and element 60. We prefer to manufacture the dipstick 62 separately. It later may be attached to the plug-element combination in a variety of conventional ways. For example, adhesive or heat bonding work well.

The breather 1 is extremely easy to use. It is inserted, in either its dipstick or air breather configuration, into the opening 5 of the reservoir 6. As illustrated in FIG. 9, the bubbles of oil and air begin to adhere to shield 4. As the pressure within reservoir 6 increases, the bubbles, in attempting to pass the shield 4, are broken. The air released from breaking bubbles escapes from the reservoir 6 via the vents 20.

Numerous variations, within the scope of the appended claims, will occur to those skilled in the art in light of the foregoing description and accompanying drawings. The shape or design of the plug 2 may vary. While plastic has been indicated as the preferred material, for that plug, other materials are suitable, plastic offering what Applicants believes to be the lowest cost choice. The size and shape of the shield 4 may be altered. Likewise, the dipstick 3 may be changed to conform to a particular application. These variations are merely illustrative.

Having thus described the invention, what is claimed and desired to be secured by Letters Patent is:

1. A device for venting air from an enclosed, agitated liquid while preventing liquid escape, comprising:
   a liquid reservoir of agitated liquid, said reservoir having at least one opening in it for receiving a fitting;
   a fitting mounted in said reservoir opening, said fitting comprising a cap structure, said cap structure including a plastic body portion having an integrally formed, closed first end and a second open end, said body portion having an external threaded wall and an internal wall defining an axial opening in said body portion, said opening extending between said second and said first ends, said cap structure having at least one hole extending radially through it near said closed end; and
   means for preventing bubble escape from said reservoir attached to said cap along said open end, said escape preventing means forming an unobstructed extension of said axial opening of said body portion, said last mentioned means comprising a tubular structure, said tubular structure having a plurality of radial openings through it distributed about its surface area, thereby being substantially pervious to air flow in all mounting positions of said fitting.

2. The fitting of claim 1 wherein said internal wall of said body portion defines an annular ridge at the juncture of said first and said second ends of said body portion, further characterized by means for determining the depth of liquid in said reservoir mounted to said cap structure, said depth determining means comprising an elongated structure having a first end and a second end, one of said first and said second ends defining a shoulder and the other of said first and said second ends having a plurality of indicia formed on it, said shoulder abutting said annular ridge of said fitting in the mounted position of said depth determining means.

3. The fitting of claim 2 wherein said outer wall of said fitting is threaded and narrows radially in a direction from said first end of said fitting and towards said second end of said fitting.

4. A fitting for preventing oil seepage from an oil reservoir containing agitated oil, comprising:
   a breather cap structure, said cap structure including a body portion having a first end and a second end, said first end of said cap defining a bolt head having a plurality of sides, at least one of said sides having a radial opening in it, said second end of said cap structure having an unobstructed opening through it, said axial opening being open at said second end and closed by said first end, said axial opening communicating with said radial openings in said cap; and
   means for breaking bubbles in said agitated oil attached to said cap, said bubble breaking means forming an unobstructed extension of the axial opening of said cap structure, said bubble breaking means comprising an open ended tubular structure mounted to said cap structure at a first end of said tubular structure and extending into said reservoir at a second end of said tubular structure, said tubular structure having a plurality of radial openings in it distributed about its surface area so as to be substantially pervious to passage of air.

5. The fitting of claim 2 wherein said bubble breaking means comprises an elongated spring structure having a first and a second end, the area between convolutions of said spring forming said radial openings, the area between convolutions of said spring being substantially constant in size.

6. The device of claim 5 further characterized by means for determining the depth of oil in said reservoir mounted to said cap structure, said depth determining means comprising an elongated structure having a first end and a second end, one of said first and said second ends having a shoulder formed on it, and the other of said first and said second ends having a plurality of indicia inscribed thereon, said bubble breaking means being mounted on said depth determining means so as to abut said shoulder, said shoulder being mounted in said cap structure.

7. The device of claim 6 wherein said outer wall of said cap structure is tapered between said first and said second ends.

8. The device of claim 7 wherein said tapered outer wall is threaded.

9. A fitting for preventing oil seepage from an oil reservoir containing agitated oil, comprising:
   a breather cap structure, said cap structure including a body portion having a first end and a second end, said first end of said cap defining a bolt head having a plurality of sides, at least one of said sides having a radial opening in it, said second end of said cap structure having an unobstructed axial opening through it, said axial opening being open at said second end and closed by said first end, said axial opening communicating with said radial openings of said cap; and
   means for breaking bubbles in said agitated oil attached to said cap, said bubble breaking means forming an unobstructed extension of the axial opening of said cap structure, said axial opening being approximately equal in diameter in both said second end of said body portion and the entire length of said bubble breaking means, said bubble breaking means comprising an open ended reach of convoluted wire mounted to said cap structure at a first end of said wire reach, the area bewteen convolutions of said wire reach being substantially constant in size, said areas defining radial opening communicating with said axial opening.

* * * * *